United States Patent [19]

Gagliani

[11] 3,748,176

[45] July 24, 1973

[54] THERMO-RECLAIMING PROCESS OF ALUMINUM SUBSTRATES FOR DISKS

[75] Inventor: John Gagliani, San Diego, Calif.

[73] Assignee: Honeywell Information Systems Inc., Waltham, Mass.

[22] Filed: Sept. 3, 1971

[21] Appl. No.: 177,802

[52] U.S. Cl. .......................... 134/2, 75/44 S, 117/2, 117/237, 134/3, 134/19, 134/34, 134/38, 134/42, 134/6

[51] Int. Cl. .................................... B23p 7/00

[58] Field of Search ........................ 134/2, 3, 19, 6; 634/38; 75/44 S; 117/2, 46 CA, 46 FC, 46 FA, 234; 134/42

[56] References Cited

UNITED STATES PATENTS

| | | | |
|---|---|---|---|
| 3,448,509 | 6/1969 | O'Reilly | 134/2 X |
| 3,018,211 | 1/1962 | Duke | 134/3 UX |
| 3,326,803 | 6/1967 | Kelly | 134/3 X |
| 2,432,868 | 12/1967 | Earl | 134/19 |
| 3,008,846 | 11/1961 | Caroselli | 134/19 X |
| 3,052,014 | 9/1962 | Falcon | 134/19 X |
| 3,076,421 | 2/1943 | Spitz | 134/19 UX |
| 3,060,064 | 10/1962 | Zingg | 134/19 UX |
| 3,346,417 | 10/1967 | Ehrlich | 134/19 X |
| 3,615,815 | 10/1971 | Wainer | 134/19 X |
| 3,623,909 | 11/1971 | Jones | 134/6 X |
| 3,650,830 | 3/1972 | Mathis | 134/19 |
| 3,099,584 | 7/1963 | Walsh | 134/38 |
| 3,008,852 | 11/1961 | Valiulis | 134/6 |
| 3,479,222 | 11/1969 | David | 134/6 X |
| 3,674,559 | 7/1972 | Whysong | 134/6 X |

*Primary Examiner*—Morris O. Wolk
*Assistant Examiner*—Sidney Marantz
*Attorney*—Ronald T. Reiling et al.

[57] ABSTRACT

Method of reclaiming magnetically unusable disks by thermodegrading the organic components of the magnetic coating to remove the coating while leaving the substrate mechanically free of imperfections.

22 Claims, 3 Drawing Figures

PATENTED JUL 24 1973

3,748,176

THERMO-RECLAIMING PROCESS OF ALUMINUM SUBSTRATES FOR DISKS

BACKGROUND OF THE INVENTION

Field of the Invention

The instant invention relates to reclaiming of substrates of magnetic recording media, and more particularly to a method of thermal reclaiming of such substrates for later re-coating and re-use.

Magnetic disks, that is, disks having a non-magnetic substrate coated with a magnetic coating, are used with data processing devices to provide large, randomly accessible, memories for storing digital data.

A typical substrate may be a disk of aluminum, glass or other non-magnetic material, machined, ground, lapped or polished to an extremely flat, smooth surface. Both surfaces of the disk are conventionally utilized, so the preparation of the substrates is a relatively expensive process. Obviously, as a result, the cost of such prepared substrates is also high.

In a typical recording disk manufacturing or coating operation, the substrates are coated with a coating having magnetic properties. The disks are then polished to extremely smooth finishes and are tested magnetically according to standard requirements. The coated disks which do not meet the magnetic requirements are unacceptable and, prior to the instant invention, had to be scrapped as non-usable material. This, of course, resulted in great monetary losses, particularly if rejection rates were high.

Accordingly, it is an object of the instant invention to provide a process for reclaiming substrates of magnetically unusable coated disks.

SUMMARY OF THE INVENTION

The above object is accomplished, according to the instant invention, by thermodegrading the organic components of the magnetic coating at elevated temperature and for varying periods of time. During this process the adhesion between the substrate and the magnetic coating is broken or destroyed so that the coating may be easily removed with a spray of water, or with gentle brushing or both.

DETAILED DESCRIPTION

Magnetic coating compositions for application to substrates have been made with a variety of binder systems both thermoplastic and thermosetting. For use with aluminum substrates, however, practically all of these compositions are of the thermosetting type. A tough magnetic coating with excellent abrasion resistance and good adhesion to the aluminum substrate may be prepared by compounding an epoxy polymer with a condensation product of formaldehyde and urea or with a condensation product of formaldehyde and a phenolic compound. The epoxy polymer has an average molecular weight of 1,800 to 3,800 and an average of from five to 10 recurring groups in the molecule.

A typical magnetic coating composition comprises an epoxy binder at about 25 – 30 parts by weight, about 15 – 25 parts of the urea formaldehyde condensation product and 40 – 50 parts iron oxide. This composition is dispersed in a volatile solvent or mixture of volatile solvents to give a coating composition for use on aluminum substrates.

Preferred epoxy polymers are Epon 1004 and Epon 1009 which are manufactured by the Shell Chemical Corporation. An amine aldehyde condensation product preferred in this coating composition is American Cyanamide Beetle 227, and a preferred aldehyde phenol condensation product is General Electric Methylon 75108.

The coating is applied to the aluminum substrates and is baked at 300° – 400°F for 2 to 4 hours to produce a crosslinked polymer system which is resistant to solvents and to mechanical abrasion. The coated disks are then polished to a roughness of less than 3 micro-inches and finally are tested magnetically according to standard requirements. The coated disks which do not meet the magnetic requirements are unacceptable and may not be used, even though the substrate may be in acceptable condition as to smoothness and flatness.

Since, at this point, the magnetic coating of the disk is fully cross-linked, and consequently is insoluble in organic solvents, the coating cannot be easily removed in order to re-use the expensive substrate material.

A process has been discovered which provides a method of reclaiming the coated disks and of making the substrates usable again, in a low cost and effective manner.

Example No. 1

Figure 1:
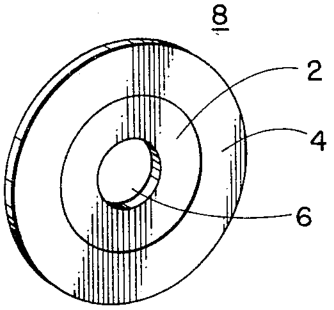
FIG. 1 shows a coated disk as in the instant disclosure.
Figure 2:
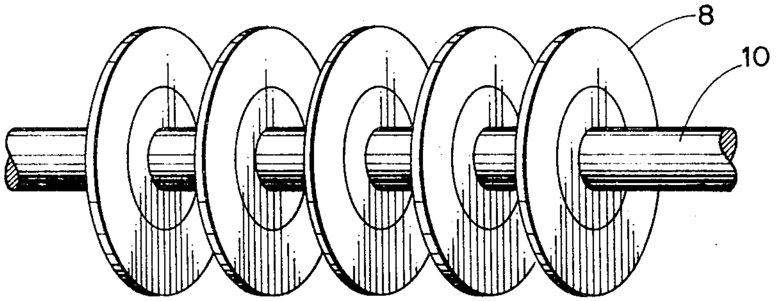
FIG. 2 shows a holding fixture whereby disks are held vertically for treatment according to the invention. The space between disks may be somewhat exaggerated for purposes of illustration.

Coated disks such as that shown in FIG. 1, may comprise a substrate 2 with a magnetic coating 4. A hole 6 is provided in the center of the disk for mounting on a spindle. Those disks which do not meet the magnetic requirements of the standards are placed in a holding fixture 10 (FIG. 2) and held in a vertical position in an air circulating oven heated at 600° to 650°F. The disks are held at this temperature for 12 hours, followed by a slow cooling process allowing the disks to come back to room temperature.

After this heat treatment, the decomposed magnetic coating is removed with a spray of water and a gentle rubbing action. The de-coated disks are dried and are ready to be reprocessed as virgin aluminum substrates.

Using this process, the mechanical and dimensional properties of the substrates are not affected during the reclaiming process.

While the optimum temperature to thermodegrade the organic component of the magnetic coating is approximately 600° – 650°F for approximately 12 hours, temperatures as low as 500°F and as high as 800°F can be used if the time cycle is adjusted and modified, so that 1 to 2 hours at 800°F or 20 hours at 500°F will be sufficient to degrade the coating in a manner explained before.

The decomposed magnetic coating is removed with a spray of fluid or a solvent. Water containing a detergent or water containing water miscible solvents can be used.

On the other hand, immersing the degraded disks in water or solvent or detergent or a solvent water mixture, followed by gentle rubbing, can easily replace the above technique of removing the magnetic coating. These liquid baths can be operated at 75° to 220°F, however, a preferred temperature range is 80° to 130°F.

Example No. 2

Figure 3:
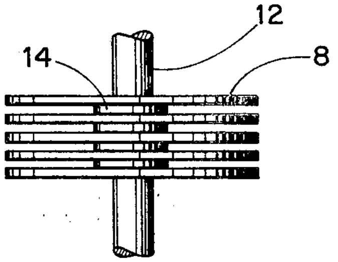
FIG. 3 shows a plurality of disks horizontally stacked with small spaced between disks.

The process is the same as the one of Example No. 1, except that the disks 8 are placed on a holding fixture 12 and held in a horizontal position (FIG. 3) stacked one on top of the other with a ¼-inch spacer 14 between the disks.

Using this configuration, the mechanical and dimensional properties of the substrates are affected to the extent that 30 percent of the substrates warped and could not be reprocessed as virgin substrates. However a sufficient percentage of substrates are recoverable, so this technique may be practical under some conditions.

In a process the same as the one of Example No. 2, the disks were stacked one on top of the other with surface to surface contact. This procedure did not cause the magnetic coating to degrade and was found not effective.

It is best to subject the decoated disks to a microscopic examination to check for complete removal of the coating or otherwise the next coating operation will result in defective disks, which are not usable magnetically.

Sometimes the microscopic examination of the decoated substrates shows small spots of coating tenaciously adhering to the aluminum substrates and in other instances, the substrate is heavily dotted with brown spots indicating that complete removal of the coating did not occur. These decoated disks must be further reprocessed to obtain a surface free of these interferring spots. A process has been developed to further reprocess these decoated disks.

Example No. 3

The disks are thermally treated and decoated as in Example No. 1. If coating spots still remain on the substrates, they are subjected to the following final cleaning operation. The substrates are scrubbed with a piece of soft cloth impregnated with a 10 percent solution of hydrochloric acid, after which they are immediately given a wash in running water. This treatment removes completely all coating spots and gives a substrate surface within the specification requirements for recoating as virgin aluminum substrates.

Example No. 4

The process is the same as that of Example No. 3 except the coating spots are now removed with a solution (10 percent by weight) of citric acid in water.

Other organic acids such as oxalic, tartaric, acetic, formic can be used and found effective.

Inorganic acids such as sulfuric acid, hydrofluoric acid, nitric acid and similar strong acids can also be used.

Example No. 5

The process is the same as that of Example No. 3 except the coating spots are now removed mechanically by machining or grinding or lapping the surface of the aluminum without losing the dimensional tolerances of the part.

In all these examples, the thermal reclaiming process produced aluminum substrates acceptable for further reprocessing into coated disks for use in magnetic recording applications.

I claim:

1. A method of removing a magnetic coating having organic components, from a substrate comprising:

a. heating the coated substrate to thermodegrade the organic components of the coating, and
b. removing the thermodegraded coating.

2. A method as set forth in claim 1 wherein said substrate is aluminum.

3. A method as set forth in claim 1 where said substrate is heated at from 500° to 800°F for from 1–20 hours.

4. A method as set forth in claim 3 wherein said substrate is heated in circulating air.

5. A method as set forth in claim 3 where said substrate is heated at from 600°F to 650°F for 12 hours.

6. A method as set forth in claim 5 wherein said substrate is heated in circulating air.

7. A method as set forth in claim 3 wherein said thermodegraded coating is removed with a liquid spray.

8. A method as set forth in claim 7 wherein said liquid spray is water.

9. A method as set forth in claim 7 wherein said liquid spray is water containing a detergent.

10. A method as set forth in claim 7 wherein said liquid spray is water containing miscible solvents.

11. A method as set forth in claim 3 wherein said thermodegraded coating is removed by gentle rubbing in a liquid bath.

12. A method as set forth in claim 11 wherein said bath contains a solvent.

13. A method as set forth in claim 11 wherein said bath contains a detergent.

14. A method as set forth in claim 11 wherein said bath is heated to between 75°F and 220°F.

15. A method as set forth in claim 14 wherein said bath is heated to between 80°F and 130°F.

16. A method of removing a magnetic coating having organic components, from a substrate comprising:

a. heating the coated substrate at from 500°F to 800°F for from 1 to 20 hours in circulating air, and
b. removing the thermodegraded coating by gentle rubbing in a liquid bath.

17. A method as set forth in claim 16 including the further step of scrubbing the substrate with a cloth impregnated with a solution of an acid selected from the group consisting of hydrochloric, citric, oxalic, tartaric, acetic, formic and strong organic or inorganic acids.

18. A method as set forth in claim 16 including the further step of scrubbing the substrate with a cloth impregnated with a solution of an acid selected from the group consisting of sulfuric, hydrofluoric, nitric and similar strong inorganic acids.

19. A method as set forth in claim 16 including the further step of machining the substrate surface.

20. A method as set forth in claim 16 including the further step of lapping the substrate surface.

21. A method as set forth in claim 16 including the further step of grinding the substrate surface.

22. A method of removing a magnetic oxide coating having organic components of the thermosetting type from an aluminum substrate comprising:

a. heating the coated substrate in circulating air to a temperature of between 600° and 650° F. to thermodegrade the organic components of the coating,
b. removing the coating by gentle rubbing in a liquid bath, and
c. scrubbing the substrate with a cloth impregnated with an acid solution.

* * * * *